United States Patent [19]

Saito

[11] 4,368,491

[45] Jan. 11, 1983

[54] DRIVING EQUIPMENT FOR MULTI-GRADATION LEVEL REPRODUCTION

[75] Inventor: Takashi Saito, Yokosuka, Japan

[73] Assignee: Nippon Telegraph & Telephone Public Corporation, Tokyo, Japan

[21] Appl. No.: 230,481

[22] Filed: Feb. 2, 1981

[30] Foreign Application Priority Data

Feb. 4, 1980 [JP] Japan ................... 55/11517

[51] Int. Cl.³ .............................................. H04N 1/40
[52] U.S. Cl. ............................. 358/283; 346/76 PH; 358/241; 358/298; 364/515
[58] Field of Search ............... 358/283, 298, 280, 241; 346/76 PH; 364/515

[56] References Cited

U.S. PATENT DOCUMENTS

| | | | |
|---|---|---|---|
| 3,609,294 | 9/1971 | Cady | 346/74 PH |
| 4,071,849 | 1/1978 | Koyano | 358/298 |
| 4,074,319 | 2/1978 | Goldschmidt | 358/241 |
| 4,240,118 | 12/1980 | Wellendorf | 358/283 |

Primary Examiner—Howard Britton
Attorney, Agent, or Firm—Pollock, Vande Sande & Priddy

[57] ABSTRACT

An input picture signal is converted, for each picture element, into a K-bit, first time-serial signal having "1s" corresponding in number to the gradation level of the picture element, and the first time-serial signal are written in a random access memory, sequentially updating its column addresses upon every writing of K bits in its column direction. The random access memory is read out, updating its row addresses upon every reading out of M bits in the row direction. A second time-serial signal thus read out from the random access memory is subjected to a serial-parallel conversion by steps of M bits and parallel outputs of the M bits are supplied to recording elements respectively corresponding thereto.

10 Claims, 23 Drawing Figures

FIG. 7

|   | $A_Y$ | | | | | | | |
|---|---|---|---|---|---|---|---|---|
| $A_X$ | 1 | 2 | ---- | 28 | 29 | 30 | 31 | 32 |
| 1 | | | | | | | | |
| 2 | | | | | | | | |
| ⋮ | | | | | | | | |
| 28 | | | | | | | | |
| 29 | | | | | | | | |
| 30 | | | | | | | | |
| 31 | | | | | | | | |
| 32 | | | | | | | | |

FIG. 8

|   | $A_Y$ | | | | | | | |
|---|---|---|---|---|---|---|---|---|
| $A_X$ | 1 | 2 | ---- | 28 | 29 | 30 | 31 | 32 |
| 1 | 1 | 1 | ---- | 1 | 1 | 1 | 1 | 1 |
| 2 | 1 | 1 | ---- | 1 | 1 | 1 | 1 | 1 |
| ⋮ | | | | | | | | |
| 28 | 1 | 1 | ---- | 1 | 1 | 1 | 1 | 1 |
| 29 | 0 | 1 | ---- | 1 | 1 | 1 | 1 | 1 |
| 30 | 0 | 0 | ---- | 1 | 1 | 1 | 0 | 1 |
| 31 | 0 | 0 | ---- | 0 | 1 | 0 | 0 | 0 |
| 32 | 0 | 0 | ---- | 0 | 0 | 0 | 0 | 0 |

DRIVING EQUIPMENT FOR MULTI-GRADATION LEVEL REPRODUCTION

BACKGROUND OF THE INVENTION

The present invention relates to a driving equipment for multi-gradation level reproduction which is used with a facsimile receiver, a printer, a light emitting display and so forth, and more particularly to a driving equipment for driving recording elements or displaying elements so as to perform not monochrome bilevel but gray scale recording.

In thermal recording employed in facsimile, since it requires a relatively long recording time of 2 to 5 msec/dot, a serial picture signal is converted into parallel signals, which are simultaneously applied as many parallel outputs to recording elements. For gray scale recording, too, such a serial-parallel conversion is needed. Driving equipments for such gray scale recording or display have been proposed in U.S. Pat. No. 4,074,319, "Light Emitting Diode Array Imaging System-Parallel Approach" issued on Feb. 14, 1978 and in U.S. Pat. No. 4,071,849, "System for Printing Images Having A Halftone" issued on Jan. 31, 1978. In the driving equipment disclosed in the former, an input picture signal is converted, for each picture element, into a signal having a plurality of pulses corresponding in number to the gradation level of the picture element and the converted signal is written in a multi-tap shift register. When a predetermined number of picture elements have been written, the shift register is read out at a low speed to derive therefrom at each tap an output which is supplied to a corresponding light emitting diode (LED) of an LED array. In this way, one picture element signal is rendered into pulses corresponding in number to the gradation level of the picture element signal. The larger the number of pulses is, the more the quantity of light emitted by the LED supplied with the picture element signal increases. Accordingly, the LED array provides a display having gray levels and, in addition, a plurality of picture element signals are applied in parallel to the LED array. This equipment requires a very large number of elements in the shift register for the serial-parallel conversion, and hence is not practical for recording or displaying a facsimile signal. Further, this equipment requires much time for changing the number of gradation levels per picture element and the number of picture elements to be applied in parallel to the LED array, and hence it is of limited application.

In the equipment set forth in the latter U.S. patent, an input picture signal is converted, for each picture element, into parallel codes of a plurality of bits, each corresponding to the gradation level of the picture element and the respective bits of the codes are written in parallel in a plurality of shift registers. When the bits have been written in the shift registers to their full capacity, the shift registers are simultaneously read out and the output codes are each written in a serial-parallel converting shift register, as a binary signal indicating whether each code is larger or smaller than a predetermined value. Upon each completion of reading out of the shift registers, the predetermined value is increased and the same operation is repeated. The parallel outputs from the serial-parallel converting shift register are simultaneously applied to corresponding recording elements. This equipment also requires a relatively large number of constituent elements and is not versatile in the modification of the number of gradation levels and the number of parallel outputs. Further, when the input signal is an analog signal, an expensive A-D converter is needed.

It is an object of the present invention to provide a driving equipment for multi-gradation level reproduction which has a small in the number of constituent elements and hence can be produced at low cost.

Another object of the present invention is to provide a driving equipment for multi-gradation level reproduction which permits easy modification of the number of gradation levels and the number of parallel outputs and hence is of wide application.

Yet another object of the present invention is to provide a driving equipment for multi-gradation level reproduction which has a small number of constituent elements and is highly universal in application and can be produced at low cost.

SUMMARY OF THE INVENTION

According to the present invention, an input picture element is converted, for each picture element, by pulse number modulated signal generating means into a serial digital signal of K bits $P_{i,1}, P_{i,2}, \ldots P_{i,K}$ (i being the number of the picture element). This conversion can be performed, for example, by known pulse number modulating means for converting a signal into pulses corresponding in number to the amplitude of the signal. By this conversion, a first time-serial signal $P_{1,1}, P_{1,2}, P_{1,3}, \ldots, P_{1,K}, P_{2,1}, P_{2,2}, P_{2,3}, \ldots, P_{2,K}, \ldots, P_{M,1}, P_{M,2}, P_{M,3}, \ldots, P_{M,K}$ is obtained. The first time-serial signal is converted by sequence converting means so that the same number j of each bit $P_{i,j}$ (j=1, 2, 3, ... K) may continue for M bits, obtaining a second time-serial signal $P_{1,1}, P_{2,1}, P_{3,1}, \ldots, P_{M,1}, P_{1,2}, P_{2,2}, P_{3,2}, \ldots, P_{M,2}, \ldots, P_{1,K}, P_{2,K}, P_{3,K}, \ldots, P_{M,K}$. This conversion can easily be carried out, for instance, by writing the first time-serial signal in a random access memory while updating its row address in a sequential order and updating its column address upon each writing of K bits of the signal in the memory, and by reading out the random access memory while updating the column address in a sequential order and updating the row address upon each reading out of the M bits. The second time-serial signal is converted into parallel signals for every M bits and the M-bit parallel outputs are supplied to M reproduction elements, i.e., recording elements or displaying elements.

As described above, according to the present invention, an input picture signal is converted into a first time-serial signal, which is further converted into a second time-serial signal, which is then subjected to a serial-parallel conversion. The sequence converting means can be formed by one or two random access memories and a very small number of elements for controlling its write and read, and the number of bits of a shift register for the serial-parallel conversion may be small and, in addition, the conversion into the first time-serial signal can be performed by a very small number of elements. Accordingly, the equipment of the present invention can be formed by a markedly small number of constituent elements as compared with the prior art equipments. Further, the number of gradation levels and the number of parallel outputs can be easily modified by changing the mode of address generation in the sequence converting means; hence, the equipment of the present invention is versatile.

BRIEF DESCRIPTION OF THE DRAWINGS

FIG. 7 is a diagram showing the order of access to a memory 55 for its write and read;

FIG. 8 is a diagram showing an example of the storage state of the memory 55;

DESCRIPTION OF THE PREFERRED EMBODIMENTS

Figure 1:
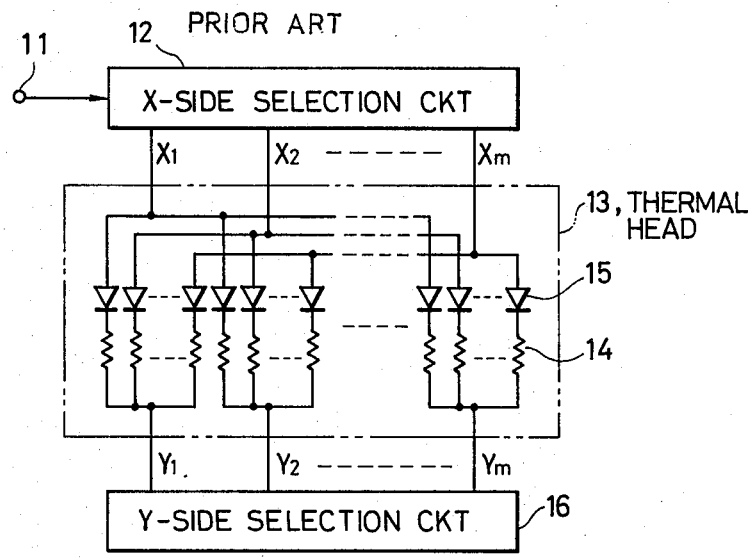
FIG. 1 is a block diagram showing a conventional driving equipment for bilevel recording of a picture signal.

To facilitate a better understanding of the present invention, a description will be given first of the prior art thermal recording. Referring first to FIG. 1, a description will be given of a driving equipment for bilevel recording of an input picture signal on a thermosensitive paper. In FIG. 1 the input picture signal is applied in serial via a terminal 11 to an X-side selection circuit 12, wherein it is converted into m-bit parallel signals $X_1, X_2, \ldots X_m$. The converted signals are supplied to a thermal head 13. Then printed dots are obtained on the thermosensitive paper (not shown). In the thermal head 13 there are provided a plurality of series circuits of heating resistors 14 and blocking diodes 15. The series circuits are connected at one end every mth ones to provide n groups and the m connection points are connected to m output terminals of the X-side selection circuit 12 respectively corresponding thereto. The corresponding ones of the series circuits of the n groups are connected at the other ends and the n connection points are respectively connected to n select terminals of a Y-side selection circuit 16. Upon each application of an m-bit signal to the X-side selection circuit 12, the Y-side selection circuit 16 yields select signals $Y_1, Y_2, \ldots Y_n$ one by one at the n select terminals in a sequential order. Accordingly, when the first m bits of an input picture signal are applied to the X-side selection circuit 12, the select signal $Y_1$ is produced and the m heating resistors 14 selected by the select signal $Y_1$ are simultaneously supplied with parallel signals $X_1, \ldots X_m$. When the next m bits of the input picture signal are provided to the X-side selection circuit 12, its parallel converted outputs $X_1, \ldots X_m$ are applied to the m heating resistors 14 selected by the select signal $Y_2$. Thus m×n printed dots of one line are obtained by selecting $Y_1$ to $Y_n$ one by one. Thereafter, the same operation as described above carrying the thermosensitive paper to a vertical direction of the array of the heating elements, are carried out repeatedly to obtain a sheet of recorded document. Accordingly, each heating resistor 14 is supplied with a signal for a period of time substantially corresponding to the m bits of the input picture signal. Thus the conventional equipment requires a relatively long time of 2 to 5 msec per bit for recording on the thermosensitive paper but permits recording of a continuous input picture signal without the necessity of converting it into a low speed signal.

Figure 2:
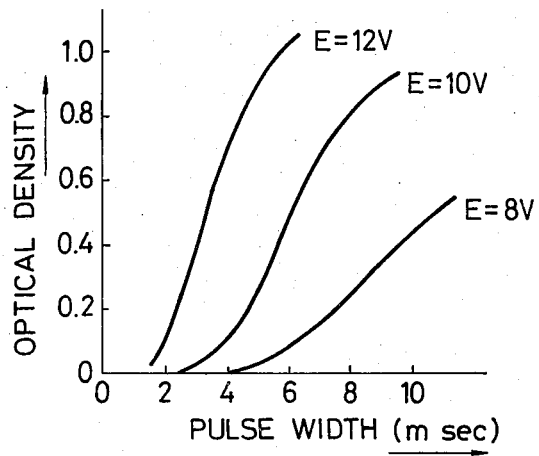
FIG. 2 is a graph showing the recording characteristic of a thermosensitive paper.

The recording by the driving equipment shown in FIG. 1 is bilevel recording that has no gray level. The recording characteristic of the thermosensitive paper is such as shown in FIG. 2 in which the optical density of a record increases in proportion to the pulse width of a recording current, the abscissa representing the pulse width and the ordinate the optical density of the record, using an applied voltage of the heating resistor as a parameter E. Accordingly, by changing the pulse width for each record dot, it is possible to obtain records having the gray level. Multi-gradation level recording equipments which perform recording or displaying with the gray level and conduct a serial-parallel conversion of an input picture signal for output are proposed in the aforementioned two U.S. patents.

The equipment disclosed in U.S. Pat. No. 4,074,319 employs an arrangement of the type depicted in FIG. 3. An input picture signal from an input terminal 11 is applied to a modifier 17, wherein it is converted, for each picture element, into a binary signal having a fixed number of bits corresponding to the gradation level of the picture element. For example, when the gradation is represenrted by eight levels including a zero level, if one picture element of the input picture signal has a level 5, "0011111" is outputted; namely, the bits of the binary signal are equally weighted. The converted output from the modifier 17 is written serially into a shift register 18 and upon completion of the write of a signal having a certain number of picture elements, for instance, five picture elements, the shift register 18 is read out but, in this case, it is read out in parallel at regular intervals of seven bits, that is, five bits are read out at a time, and the read rate is selected to be 1/5 the write rate. The parallel bit signals thus read out are provided via a selector 19 to those light emitting diodes (LEDs) of an LED array 21 which respectively correspond to the bit signals. During the parallel read out of shift register 18 the output from the modifier 17 is written into another shift register 22. Upon completion of the read-out operation of the shift register 18, the shift register 22 is read out and its parallel five bits are supplied via the selector 19 to the LED array 21. In the read-out of the shift register 18 (or 22) the 7-bit signal for each picture element is derived from one read output line of the shift register and the number of "1s" in the 7-bit signal corresponds to the gradation level of the picture element. Accordingly, the lighting period of the LED which is supplied with the signal from the output line varies with the number of "1s" supplied in the 7-bit period and the quantity of light which is emitted from the LED corresponds to the gradation level of the supplied picture element signal. By the control of a control element 23, the modifier 17 is activated and the control element 23 controls switching of the selectors 19 and 24. The selector 24 selects write clock and read clock signals from the control element 23 and applies them to the shift registers 18 and 22.

Figure 3:
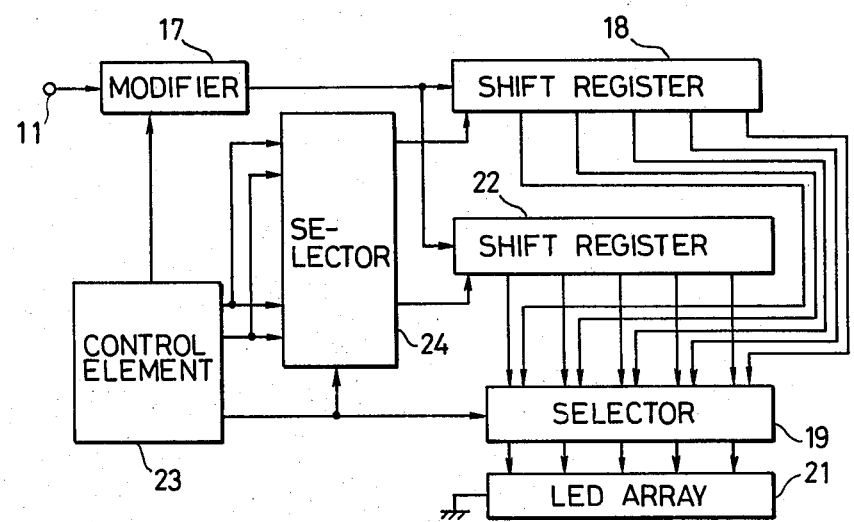
FIG. 3 is a block diagram showing a conventional driving equipment for multi-gradation level reproduction.

In the equipment shown in FIG. 3, since the number of bits of each of the shift registers 18 and 22 is large, they are large in scale and consequently the scale of the selector 19 is also large. Further, the gradation level reproducibility varies with the thermosensitive paper or the displaying elements used and, in addition, the operating speed of the facsimile receiver is diversified; accordingly, the number of parallel bits to the recording elements or displaying elements, that is, the number of parallel output bits of each of the shift registers 18 and 22 in FIG. 3, differs according to the operating speed. To cope with this, it is necessary to change the positions of the parallel output terminals of the shift registers 18 and 22 or to increase the number of bits, but this is very time-consuming and cumbersome and hence is essentially impossible. In other words, this equipment lacks versatility.

Figure 4:
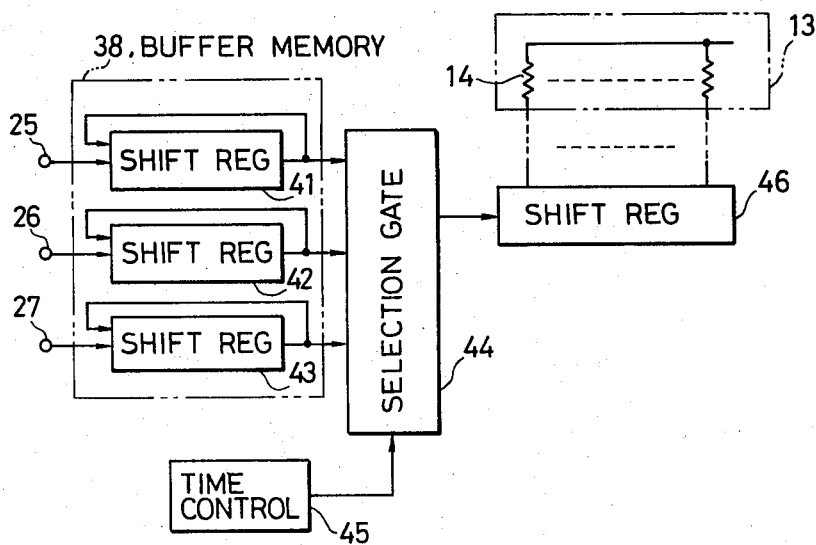
FIG. 4 is a block diagram showing another arrangement of the conventional driving equipment.

Turning next to FIG. 4, the equipment of U.S. Pat. No. 4,071,849 will be briefly described. An input picture signal is rendered, for each picture element, into a binary code of parallel three bits corresponding to the gradation level of the picture element, and the binary codes are respectively written into shift registers 41, 42 and 43 of a buffer memory 38 via input terminals 25, 26 and 27. When input picture signals of picture elements of one line have been written in the buffer memory 38, it is read out. The shift registers 41, 42 and 43 are of the circulating type and their outputs are applied to a selection gate circuit 44 and, at the same time, they are fed back to the input sides of the shift registers. The selection gate circuit 44 is supplied with a 3-bit threshold code from a time control circuit 45 and yields an output "1" or "0" depending on whether the code from the buffer memory 38 is larger or smaller than the threshold value. The serial output from the selection gate circuit 44 is provided to a shift register 46, wherein it is subjected to a serial-parallel conversion and the parallel outputs are respectively supplied to heating resistors 14 of a thermal head 13. Whenever the shift registers 41, 42 and 43 have been read out over the entire areas thereof, the threshold value of the threshold code derived from the time control circuit 45 is increased sequentially and the whole of the buffer memory 38 is read out repeatedly by the number of maximum gradation levels. Accordingly, in the case of a picture element having a large gradation level, the number of "1s" which are supplied to the same heating resistor 14 after starting to read out the buffer memory 38 increases, performing gray scale recording. In the equipment depicted in FIG. 4, too, since it employs, as the buffer memory 38, shift registers of the same number as that of the parallel bits of the input binary code, its scale is relatively large, as will be described later in comparison with an embodiment of the present invention. Further, in the case of changing the number of gradation levels or the number of parallel bits, it is necessary to increase the number of shift registers used; accordingly, this equipment is also of limited application. Moreover, when the input picture signal is an analog signal, an expensive A-D converter is needed to convert the input picture signal to a binary code signal of parallel bits.

Figure 5:
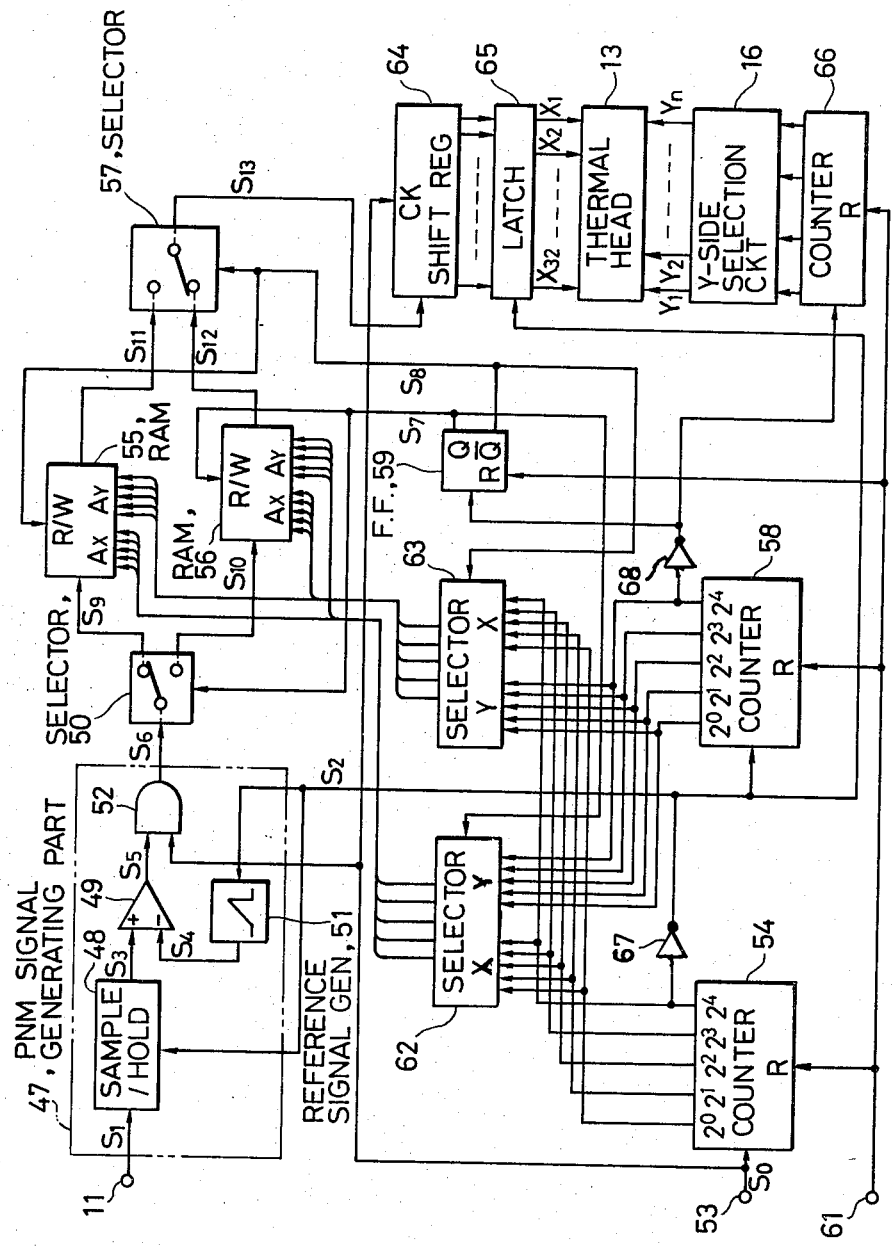
FIG. 5 is a block diagram illustrating an embodiment of the driving equipment of the present invention.
Figure 6:
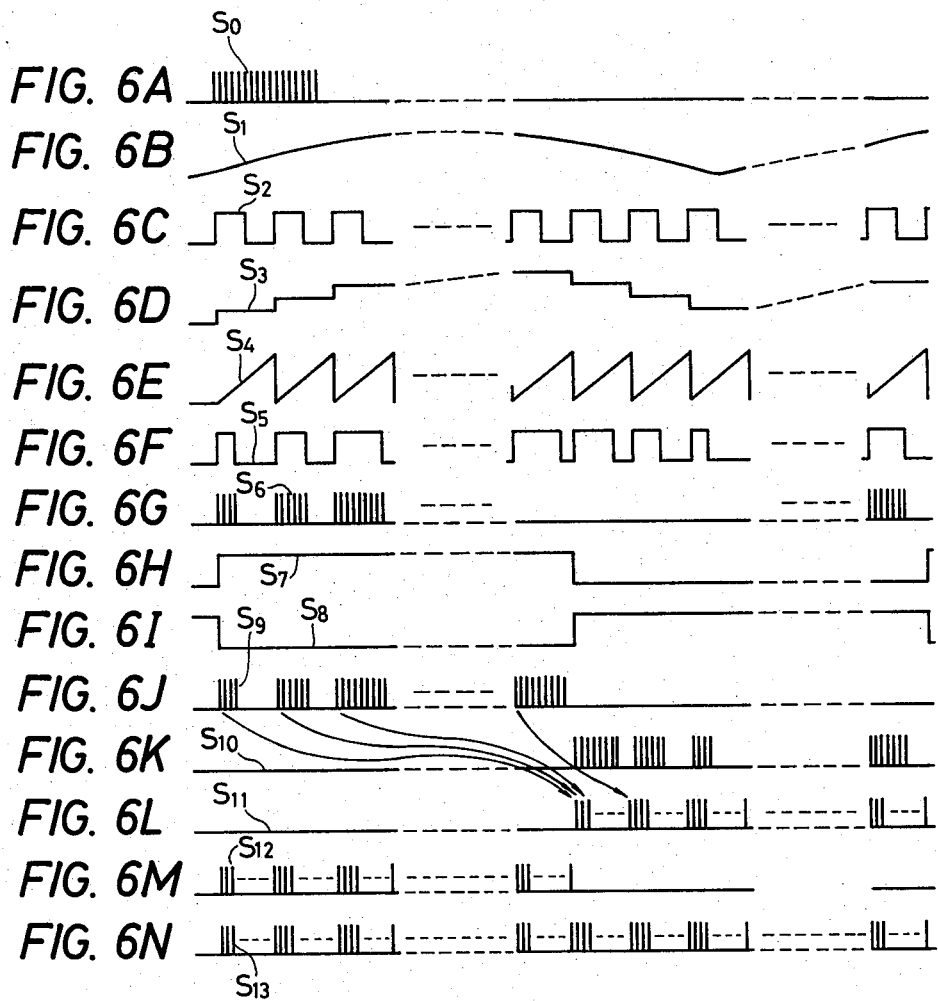
FIG. 6A is a diagram which depicts clock signal $S_0$ supplied to terminal 53 of FIG. 5.
FIG. 6B depicts input signal $S_1$ of FIG. 5.
FIG. 6C depicts sampling clock signal $S_2$ of FIG. 5.
FIG. 6D depicts output signal $S_3$ from sample/hold circuit 48 of FIG. 5.
FIG. 6E depicts output signal $S_4$ from reference signal generator 51 of FIG. 5.
FIG. 6F depicts output signal $S_5$ from comparator 49 of FIG. 5.
FIG. 6G depicts the pulse number modulated signal $S_6$ of FIG. 5.
FIG. 6H depicts output signal $S_7$ at the Q-output of flip-flop 59 of FIG. 5.
FIG. 6I depicts output signal $S_8$ at the Q-output of flip-flop 59 of FIG. 5.
FIG. 6J depicts input signal $S_9$ to RAM 55 of FIG. 5.
FIG. 6K depicts input signal $S_{10}$ to RAM 56 of FIG. 5.
FIG. 6L depicts output signal $S_{11}$ from RAM 55.
FIG. 6M depicts output signal $S_{12}$ from RAM 56.
FIG. 6N depicts output signal $S_{13}$ from selector 57 of FIG. 5.

FIG. 5 illustrates an embodiment of the driving equipment of the present invention, in which the number of gradation levels without white level "0", K, is 32 and the number of picture elements to be applied simultaneously, M, is 32. For instance, a picture signal $S_1$ shown in FIG. 6B is applied from an input terminal 11 to a pulse number modulated signal generating part 47, wherein it is converted, for each picture element, into a 32-bit serial digital signal in accordance with the gradation level of the picture element. The bits of this digital signal are equally weighted and the number of the bits is equal to the highest gradation level K. The pulse number modulated signal generating part 47 has an arrangement such, for example, as shown in FIG. 5, in which in a sample hold circuit 48 the input picture signal is sample-held, for each picture element, by a clock pulse $S_2$ of a frequency $\phi$ depicted in FIG. 6C. The output $S_3$ from the sample hold circuit 48 is such as depicted in FIG. 6D in which the sample value, that is, the amplitude value corresponding to the gradation level of each picture element is held until the occurrence of the next sample clock pulse. The output signal $S_3$ is provided to a comparator 49 for comparison with a sawtooth reference signal $S_4$ of FIG. 6E which is applied from a reference signal generator 51. The reference signal $S_4$ is synchronized with the clock pulse $S_2$ and the output from the comparator 49 is provided as a pulse width modulated (PWM) signal $S_5$ as shown in FIG. 6F which has a pulse width corresponding to the gradation level of each picture element. The signal $S_5$ is applied to an AND circuit 52, wherein it is AND'ed with a high-speed clock pulse $S_0$ (FIG. 6A) whose frequency is 32 times higher than the clock pulse $S_2$ and which is applied from a terminal 53, yielding a pulse number modulated (PNM) signal $S_6$ (FIG. 6G). Letting each bit of the pulse number modulated signal $S_6$ be represented by $P_{i,j}$ (i being the number of the picture element and j the number of the gradation level), the signal $S_6$ is a first time-serial signal having the bits arranged in the order $P_{1,1}, P_{1,2}, P_{1,3}, \ldots, P_{1,32}, P_{2,1}, P_{2,2}, P_{2,3}, \ldots P_{2,32}, \ldots P_{32,1}, P_{32,2}, P_{32,3}, \ldots, P_{32,32}$, and this is the output from the pulse number modulated signal generating part 47. Accordingly, the gradation level information of the picture element i is converted into 32 binary signals of the PNM signal $P_{i,j}$ (j=1 to 32), and the number of "1s" occurring in succession in the signal $P_{i,j}$ is dependent on the gradation level of the picture element. The high-speed clock pulses $S_0$ from the terminal 53 is provided to a counter 54, wherein it is frequency-divided down to 1/32 to produce the signal $S_2$, which is supplied to the reference signal generator 51 to drive it.

The pulse number modulated signal $S_6$ is written in one of two random access memories 55 and 56 via a selector 50. The signal $S_6$ is written in and read out of the memories 55 and 56 alternately with each other by steps of M (32 in this example) picture elements. The memories 55 and 56 each have a capacity of $32 \times 32 = 1024$ bits and a predetermined one of the memory cells is accessed by an address Ax for assigning one of 32 row select lines and an address Ay for assigning one of 32 column select lines. Now, a description will be given, with reference to FIG. 7, of the order of accessing the memory 55. The address (Ax, Ay) for the memory 55 is updated in the order (1,1)→(2,1)→ . . . (32,1)→(1,2)→ . . . (32,32), that is, the row address Ax is sequentially updated, and whenever the number of the highest gradation level K (32) is reached, the column address Ay is updated. In this way, the signal $S_6$ is written in the order indicated by the solid line arrows in FIG. 7. In this case, information thus stored in the memory 55 is such, for example, as depicted in FIG. 8. In FIG. 8, each column (Ay) corresponds to each of the M=32 picture elements which are to be applied simultaneously and the larger the amplitude of each picture element of the picture signal $S_1$, the more "1s" occur in succession in the column direction. The memory 56 is also written and read out in the same way as the memory 55.

Figure 9:
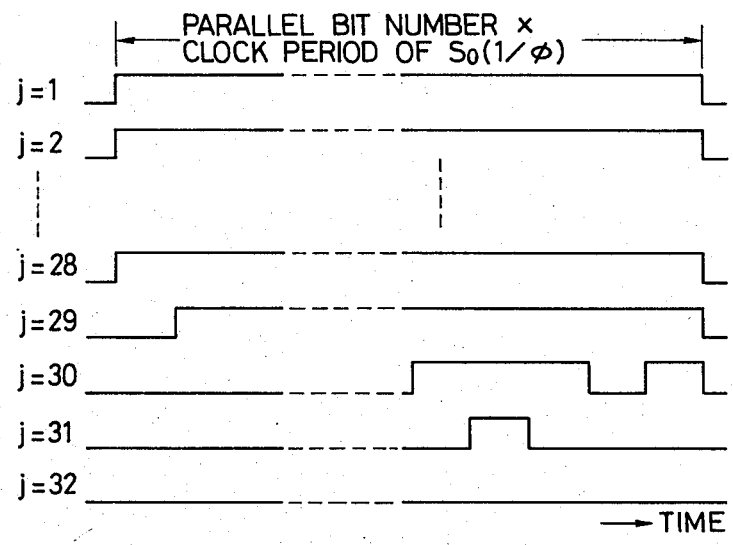
FIG. 9 is a diagram showing the waveform of an output $S_{13}$ from a selector 57 in FIG. 5 in the case of the storage state of FIG. 8.

The information of the 32 picture elements thus stored in one of the memories 55 and 56 is read out in the order described below while information of the next 32 picture elements is stored in the other memory. By updating the column address Ay in the order (1,1)→(1,2)→ . . . (1,32)→(2,1)→ . . . (32,32) as indicated by the broken line arrows in FIG. 7 and by updating the row address Ax whenever the number M (32) is reached, the information is read out in synchronism with the high-speed clock pulse $S_0$. A signal $S_{11}$ thus read out from the memory 55 has the waveform as depicted in FIG. 9. In FIG. 9, reference character j indicates the number of the gradation level, which is equal to the number of the row address Ax in FIG. 8. The signals $S_{11}$ and $S_{12}$ (FIGS. 6L and M) read out from the memories 55 and 56 are combined by a selector 57 into a signal $S_{13}$ (FIG. 6N). The signal $S_{13}$ is a second time-serial signal whose bits are arranged in the order $P_{1,1}, P_{2,1}, P_{3,1}, \ldots, P_{32,1}, P_{1,2}, P_{2,2}, P_{3,2}, \ldots, P_{32,2}, \ldots, P_{1,32}, P_{2,32}, P_{3,32}, \ldots, P_{32,32}$. This signal is one in which 32 bits of the first time-serial signal $S_6$ occur in succession for the same number of the gradation level j.

The addresses Ax and Ay for the memories 55 and 56 and control signals for the selectors 50 and 57 are generated in the following manner. The high-speed clock pulses $S_0$ from the terminal 53 are counted by the 32-step counter 54. The signal $S_2$ which is an inverted $2^4$ output of the counter 54 by an inverter 67 is counted by a 32-step counter 58. The output from the counter 58 is inverted by an inverter 68 and provided to a toggle flip-flop 59 to drive it. The counters 54 and 58 and the flip-flop 59 are each reset by a phase signal from a terminal 61 at the starting of scanning. The flip-flop 59 is reversed every 1024 high-speed clock pulses $S_0$ to derive at its Q and Q output terminals as signals $S_7$ and $S_8$ as shown in FIGS. 6H and 6I respectively which are 180° out of phase with each other. The signals $S_7$ and $S_8$ are applied as read/write control signals to read/write terminals of the memories 55 and 56, respectively, and at the same time, they are provided as selection control signals to selectors 62 and 63, respectively, and further applied as switching control signals to the selectors 50 and 57, respectively. The count contents of the counters 54 and 58 are supplied to the X and Y input sides of the selectors 62 and 63. The selectors 62 and 63 each output one of the X and Y inputs in accordance with the select control signals $S_7$ and $S_8$. The output from the selector 62 is applied to the address Ax of the memory 55 and the address Ay of the memory 56. The output from the selector 63 is provided to the address Ay of the memory 55 and the address Ax of the memory 56. Let it be assumed that the memories 55 and 56 perform the write operation when the inputs to their read/write terminals are low-level and the read operation when the inputs are high-level, that the selector 50 connects the output side of the AND circuit 52 to the input side of the memory 55 or 56 depending on whether the switching control signal $S_7$ is high-level or low-level, that the selector 57 connects the output side of the memory 55 or 56 to the input side of a shift register 64 depending on whether the switching control signal $S_8$ is high-level or low-level, and that the selectors 62 and 63 select the X input side or Y input side depending on whether their selection control signals $S_7$, $S_8$ are high-level or low-level.

When the signal $S_7$ is high-level as shown in FIG. 6H, the signal $S_8$ is low-level and the memory 55 performs the write operation. In the selectors 62 and 63 the count contents of the counters 54 and 58 are selected and applied as the address Ax and Ay to the memory 55. Further, since the selector 50 is connected to the side of the memory 55 as illustrated, the signal $S_6$ is applied as a write signal to the memory 55 as indicated by $S_9$ in FIG. 6J and this signal is written in the memory 55 in the solid line order of addresses as described previously in respect of FIG. 7. Further, at this time, since the memory 56 is in the read-out state and is supplied with the count contents of the counters 54 and 58 as the addresses Ay and Ax, the memory 56 is read out in the broken line order of addresses as referred to previously in connection with FIG. 7 and the information thus read out is applied to the shift register 64. Upon counting 1024 high-speed clock pulses $S_0$ by the counter 58, the flip-flop 59 is reversed by the count output from the counter 58 to make the signal $S_7$ low-level and the signal $S_8$ high-level, by which the memory 55 is put in its read-out state and memory 56 is put in its write state. The selectors 62 and 63 respectively select the contents of the counters 58 and 54, which are respectively provided to the addresses Ax and Ay of the memory 55, and to the addresses Ay and Ax of the memory 56. The signal $S_9$ written in the memory 55 previously is read out as a signal $S_{11}$, as shown in FIG. 6L and the signal $S_6$ is written as a signal $S_{10}$ (FIG. 6K) in the memory 56 via the selector 50. Accordingly, the selectors 50 and 57, the memories 55 and 56, the counters 54 and 58 and the selectors 62 and 63 constitute sequence converting means for converting the first time-serial signal $S_1$ into the second time-serial signal $S_{13}$.

Figure 10:
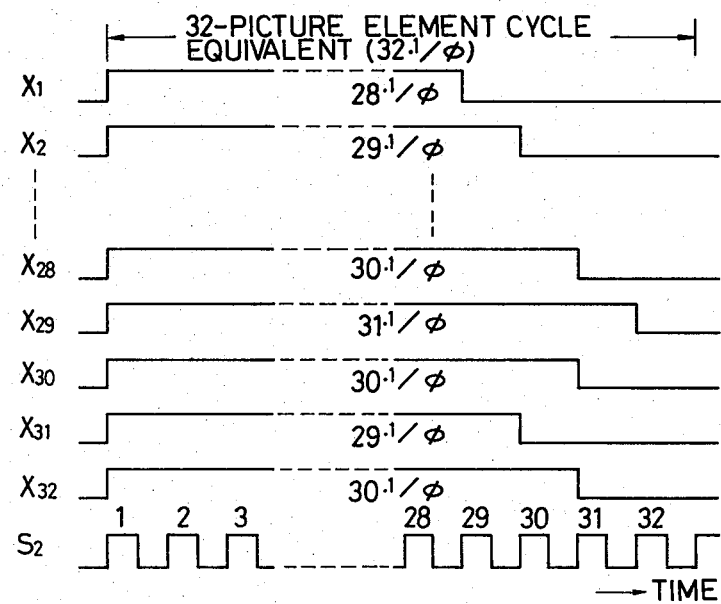
FIG. 10 is a diagram showing waveforms of outputs $X_1$ to $X_{32}$ from a latch 65 corresponding to the example of FIG. 9.

To the shift register 64 is applied, as a shift clock pulse, the high-speed clock pulse $S_0$ from the terminal 53, so that the second time-serial signal $S_{13}$ is written serially in the shift register 64 in synchronism with the high-speed clock pulse $S_0$. In the present example, since the number of shift stages or the parallel bit number of the shift register 64 is 32, the time period necessary to fill the shift register 64 with 32 bits of $S_{13}$ coincides with $1/\phi$ as shown in FIG. 9. The shift register 64 converts the signal $S_{13}$ to parallel signals by steps of 32 bits and transfers them in parallel to a latch 65. The signal $S_2$ is provided as a latch command to the latch 65 to latch the parallel outputs from the shift register 64. Parallel outputs $X_1$ to $X_{32}$ from the latch 65 are supplied to the corresponding heating resistors 14 of the thermal head 13. The waveforms of the outputs $X_1$ to $X_{32}$ from the latch 65 are such as depicted in FIG. 10 in the case of the signal $S_{13}$ shown in FIG. 9. In the example of FIG. 9, since "1s" are applied to all shift stages of the shift register 64 at the gradation levels from 1 to 28, "1" occurs in succession in the outputs $X_1$ to $X_{32}$ for the 1st to 28th pulses of the clock signal $S_2$. When $j=29$ in FIG. 9, a first bit becomes "0" and the other bits remain at "1", so that only the last stage output of the shift register 64 becomes "0" and, upon occurrence of a 29th pulse of the clock signal $S_2$, the output $X_1$ becomes "0" and the outputs $X_2$ to $X_{32}$ remain at "1", as shown in FIG. 10. Similarly, the outputs $X_1$ to $X_{32}$ are retained at "1" from the time of latching "1" to the time of latching "0". The period during which each of the data from the shift register 64 is latched is equal to the period $1/\phi$ of the clock signal $S_2$ in this example. Accordingly, the pulse widths of the latch outputs $X_1$ to $X_{32}$ are each an integral multiple of $1/\phi$ and varies by steps of $1/\phi$ over a range from 0 to $32/\phi$.

In this way, the 32 parallel outputs $X_1$ to $X_{32}$ are obtained which have pulse widths respectively corresponding to the varying amplitude of the picture signal. The pulse width modulated parallel outputs $X_1$ to $X_{32}$ are applied to the corresponding heating resistors 14 (not shown) of a thermal head 13 similar to that depicted in FIG. 1 and the heating resistors of a block specified by a Y-side selection circuit 16 are conducted. At this time, dots of optical densities corresponding to the pulse widths of the parallel outputs $X_1$ to $X_{32}$ are formed on thermosensitive paper (not shown) held in contact with the thermal head 13, thus achieving gray scale recording. The carry output from the counter 58 is counted by a counter 66, two, and its count value is decoded by the Y-side selection circuit 16 and derived as one of outputs $Y_1$ to $Y_n$. Accordingly, for each switching of the write and read operations of the memories 55 and 56, the counter 66 is stepped one stage to change over the group of heating resistors 14 to be selected. The counter 66 is reset by the phase signal from the terminal 61.

In the embodiment illustrated in FIG. 5, the number of gradation levels, $K=32$, and the number of picture elements to be simultaneously applied to the thermal head 13, that is, the number of parallel outputs $X_1$ to $X_{32}$, $M=32$, are selected equal to each other, thereby simplifying the two-dimensional access. Namely, as described previously, the address information generated by the counters 58 and 54, that is, their count values, are applied to high-order five bits and low-order five bits of the address input terminals of the memories 55 and 56 while being changed over by the selectors 62 and 63 by steps of 32 picture elements, thus accessing the memories 55 and 56 in a desired order. Even in the case where the number of gradation levels, $K$, and the number of picture elements to be simultaneously applied to the thermal head, $M$, differ, $K$ rows and $M$ columns of memory cells of the memories 55 and 56 are accessed and the order of accessing them for write and read is switched between the column and row directions, as described previously with regard to FIG. 7. Further, the distribution of the address high-order and low-order bits of the output bits from the counters 54 and 58 can be changed so that, for example, in the case of $K=8$ and $M=128$, the outputs $2^0$, $2^1$, $2^2$ of the counter 54 and the outputs $2^3$, $2^4$ of the counter 54, $2^0$, $2^1$, $2^2$, $2^3$, $2^4$ of the counter 58 may be switchingly applied to the address low-order and high-order bits of the memories 55 and 56 in accordance with the numbers $K$ and $M$. Moreover, it is also possible to increase or decrease the number of output bits of the counters 54 and 58 in accordance with the numbers $K$ and $M$ and to select the numbers $K$ and $M$ to be values other than $K \times M = 1024$ within the capacity of the memories 55 and 56.

While in the foregoing it is described that the first time-serial signal $P_{1,1}$, $P_{1,2}$, $P_{1,3}$, ..., $P_{1,K}$, $P_{2,1}$, $P_{2,2}$, $P_{2,3}$, ..., $P_{2,K}$, ..., $P_{M,1}$, $P_{M,2}$, $P_{M,3}$, ..., $P_{M,K}$ is converted into the second time-serial signal $P_{1,1}$, $P_{2,1}$, $P_{3,1}$, ..., $P_{M,1}$, $P_{1,2}$, $P_{2,2}$, $P_{3,2}$, ..., $P_{M,2}$, ..., $P_{1,K}$, $P_{2,K}$, $P_{3,K}$, ..., $P_{M,K}$, the present invention is not limited specifically thereto and it is also possible to convert the first time-serial signal into a second time-serial signal, for example, $P_{M,1}$, $P_{M-1,1}$, $P_{M-2,1}$, ..., $P_{1,1}$, $P_{M,2}$, $P_{M-1,2}$, $P_{M-2,2}$, ..., $P_{1,2}$, ..., $P_{M,K}$, $P_{M-1,K}$, $P_{M-2,K}$, ..., $P_{1,K}$, or $P_{1,K}$, $P_{2,K}$, $P_{3,K}$, ..., $P_{M,K}$, $P_{1,K-1}$, $P_{2,K-1}$, $P_{3,K-1}$, ..., $P_{M,K-1}$, ..., $P_{1,1}$, $P_{2,1}$, $P_{3,1}$, ..., $P_{M,1}$. In FIG. 5, the latch 65 may be omitted. Further, the equipment of the present invention is applicable to the driving of not only the thermal head but also, for instance, a recording head for electrostatic recording. In such a case, a sawtooth voltage having a period of one picture element recording time $1/\phi$ is provided to a common electrode disposed on one side of electrostatic recording paper and parallel outputs $X_1$ to $X_M$ are provided to dot electrodes disposed on the other side of the recording paper. Moreover, the present invention can be applied not only to the driving of such recording elements but also to the driving of displaying elements such as an LED array, as described previously with respect to FIG. 3.

Next, a description will be given of differences between the embodiment of the present invention shown in FIG. 5 and the prior art examples depicted in FIGS. 3 and 4. In the equipment of FIG. 3, the output from the modifier 17 is the same as the output $S_6$ from the AND circuit 52 in FIG. 5; in FIG. 3, however, this time-serial signal is inputted to the multi-tap shift registers 18 and 22 and the output signals therefrom have the same signal arrangement as the input signal but the output signals are delivered from a plurality of stages of the signal configuration at the same time and the shift registers 18 and 22 are read out at a low speed. In contrast thereto, in FIG. 5 the random access memories 55 and 56 are employed and the input signals thereto and the output signals therefrom differ in configuration and the output signals are subjected to serial-parallel conversion in the shift register 64.

In the existing facsimile system, the time for obtaining a ISO A4-size recorded document is one, three or six minutes according to the equipment used and the number of picture elements to be simultaneously applied, M, varies with the recording speed. Further, the thermosensitive paper now available has about 16 gradation levels but it is expected that its gradation property will be enhanced. In view of these points, it is preferred that the number of gradation levels, $K$, and the number of picture elements to be simultaneously applied, $M$, can be varied over a wide range. By the way, for example, in order to increase the number of gradation levels, $K$, in the prior art equipment of FIG. 3, it is necessary to change the tap leading-out positions of the shift registers 18 and 22 and to increase the number of shift stages of the shift registers 18 and 22; however, such modifications are essentially impossible. For increasing the number of bits to be simultaneously applied, M, too, the number of shift stages of the shift registers 18 and 22 must be increased, resulting in an increase in the amount of hardware used. In contrast thereto, in the equipment of FIG. 5, when $K=32$ and $M=32$, they can be changed to 16 and 64, or 8 and 128, respectively, by using the same memories 55 and 56 and modifying the bit distribution in the outputs from the counters 54 and 58. Further, by employing, as the memories 55 and 56, those having sufficient capacity, one or both of the abovesaid numbers K and M can be increased simply by changing the connections of the outputs of the counters 54 and 58. When counters with a sufficiently large number of count now on the market are used as the counter 54 and 58, the numbers K and M can be modified without replacement of the counters 54 and 58. It is clear of course that the numbers K and M can freely be decreased. Moreover, when using, as the memories 55 and 56, those of different capacities but of the same array of pins, it is sufficient, for the modification of the numbers K and M, only to replace the memories 55 and 56 and the amount of hardware need not be increased. Thus the equipment of FIG. 5 is versatile.

In the conventional equipment shown in FIG. 4, the time-serial signal from the selection gate 44 corresponds to the output $S_{13}$ from the selector 57 in the equipment of FIG. 5 and the prior art equipment is identical with the embodiment of FIG. 5 in that the time-serial signal is subjected to the serial-parallel conversion in the shift register 46. However, the equipment of FIG. 4 entirely differs from the equipment of FIG. 5 in the means for obtaining the second time-serial signal $S_{13}$. In FIG. 4, binary-coded signals of three bits per picture element for eight gradation levels, for example, are written in parallel in the shift registers 41, 42 and 43. For increasing the number of gradation levels, K, it is necessary to increase the number of shift registers of the buffer memory 38 and, for increasing the number of bits to be simultaneously applied, M, the number of shift stages of the shift registers 41, 42 and 43 must be increased; and both of these modifications require an increase in the amount of hardware. Further, when changing K=32 and M=32 to K=16 and M=64 or K=8 and M=128 as mentioned previously, it is necessary to replace all of the buffer memory 38, the selection gate 44 and the time control circuit 45. In other words, the prior art equipment of FIG. 4 is not as versatile as the equipment of FIG. 5. Moreover, as described previously, in the case where the input picture signal is an analog signal, it must be converted by an A-D converter into a digital signal of parallel bits and the A-D converter is expensive.

Next, it will be described concretely that in the case of employing general purpose IC elements now on the market, the embodiment of FIG. 5 requires far less hardware than the conventional equipments of FIGS. 3 and 4. In the case of recording on an A4-size recording paper through utilization of commercially available 8-bit shift registers, with the numbers M and K being 128 and 32 respectively, the equipment of FIG. 3 requires (32/8=) four shift registers as the shift registers 18 and 22 since K=32 for each picture element and (4×128×2=) 1024 8-bit shift registers since M=128 and since the shift registers 18 and 22 are two each. Further, the selector 19 requires about 32 4-bit selectors because M=128 and, in addition, several IC elements are needed for each of the modifier 17 and the control element 23 and one IC element for the selector 24. Accordingly, the equipment of FIG. 3 requires a total of approximately 1100 IC elements and inevitably lacks versatility.

In the equipment of FIG. 4, one of the shift registers forming the buffer memory 38 is a 128-bit register and (128/8=) 16 8-bit shift registers are needed and since K=32, the buffer memory 38 is formed by five rows of shift registers; accordingly, (16×5=) 80 8-bit shift register are required in all. In the case of performing such parallel read-write operations as described in FIG. 3 or 5, another buffer memory must be provided in addition to the buffer memory 38, thus a total of 160 8-bit shift registers are needed and, in addition, one IC element is required for each of the selection gate 44 and the time control circuit 45. Further (128/8=) 16 8-bit shift registers for the shift register 46, and 16 8-bit latches which are not shown in FIG. 4 but would be needed for the same operation as FIG. 5, are required. Accordingly, the equipment of FIG. 4 requires a total of approximately 200 IC elements.

In contrast thereto, in the embodiment of FIG. 5 the memories 55 and 56 can each be constituted by a (128×32=) 4096 bit memory element, the counters 54 and 58, the selectors 62 and 63, the comparator 49, the reference signal generator 51 and the sample hold circuit 48 can each be formed by one IC element and, in addition, the AND circuit 52 and the selectors 50 and 57 can each be formed by one IC element. Furthermore, (128/8=) 16 8-bit shift registers for the shift register 64 and 16 8-bit latches for the latch 65 are required. Accordingly, the equipment of FIG. 5 can be constituted by less than 50 IC elements in all. This indicates that the equipment of the present invention requires far less hardware than the equipments of FIGS. 3 and 4 which require about 1100 and about 200 IC elements, respectively.

As has been described in the foregoing, according to the present invention, the conversion to pulses having pulse widths of a plurality of gradation levels, which involves a serial-parallel conversion, can be achieved by a simple circuit arrangement and a driving equipment for multi-gradation level reproduction can be provided economically which is used with a thermal recording device, an electrostatic recording device and a display device having a displaying element array. Further, the present invention is capable of coping with even an appreciable increase in the number of gradation levels by speeding up the high-speed clock pulse $S_0$ and by increasing the memory capacity, and hence does not lead to a large increase in hardware. Moreover, the present invention is versatile in the modification of the number of gradation levels K and the number of parallel input bits M.

It will be apparent that many modifications and variations may be effected without departing from the scope of the novel concept of this invention.

What is claimed is:

1. A driving equipment for multi-gradation level reproduction, comprising:
    pulse number modulated signal generating means for converting an input picture signal including gradation level information into a serial digital signal, having K (an integer 2 or more) bits $P_{i,1}, P_{i,2}, \ldots, P_{i,K}$ (i being the number of a picture element) per picture element, corresponding to the gradation level of the picture element to obtain a first time-serial signal $P_{1,1}, P_{1,2}, P_{1,3}, \ldots, P_{1,K}, P_{2,1}, P_{2,2}, P_{2,3}, \ldots, P_{2,K}, \ldots, P_{M,1}, P_{M,2}, P_{M,3}, \ldots, P_{M,K}$;
    sequence converting means for converting the first time-serial signal into a second time-serial signal which, letting each bit of the first time-serial signal be represented by $P_{i,j}$ (j=1, 2, ... K), has bits $P_{1,1}, P_{2,1}, P_{3,1}, \ldots, P_{M,1}, P_{1,2}, P_{2,2}, P_{3,2}, \ldots, P_{M,2}, \ldots$ , $P_{1,K}, P_{2,K}, P_{3,K}, \ldots, P_{M,K}$ so that the number j may continue for M bits while changing in a sequential order;

serial-parallel converting means for serial-parallel converting the second time-serial signals by steps of M bits into parallel signals of M bits; and dirving means for applying the parallel signals of M bits simultaneously to M reproduction elements.

2. A driving equipment according to claim 1, wherein the sequence converting means comprises a random access memory having more than K=M memory cells accessed by column and row addresses, and read/write control means for writing the first time-serial signal in the random access memory in its column direction for every K bits and reading them out from the memory in its row direction for every M bits.

3. A driving equipment according to claim 2, wherein two memories are provided and the read/write control means is arranged so that while one of the memories performs a write operation, the other memory performs a read operation and that, upon each completion of the writing of the K=M bits, the write and the read operation are changed over to each other.

4. A driving equipment according to claim 3, wherein the read/write control means comprises a counter for counting clock pulses synchronized with the converting operation of the pulse number modulated signal generating means, first and second selectors for switching low-order bit outputs and high-order bit outputs from the counter and supplying them to row and column addresses of the two random access memories, and switching control means for controlling the switching of the first and second selectors in synchronism with the changeover of the write and the read operation.

5. A driving equipment according to any one of claims 1 to 4, wherein the serial-parallel converting means is formed by a shift register which is supplied with the second time-serial signal to output M bits in parallel.

6. A driving equipment according to claim 5, further comprising an M-bit latch by which, upon every application of M bits of the second time-serial signal to the shift register, the contents of the M bits are latched.

7. A driving equipment according to any one of claims 1 to 4, wherein the reproduction elements are heating resistors of a thermal head for recording on thermosensitive paper.

8. A driving equipment according to any one of claims 1 to 4, wherein the pulse number modulated signal generating means is means for converting each picture element into pulses corresponding in number to the gradation level of the picture element.

9. A driving equipment according to claim 8, wherein the pulse number modulated signal generating means is means for converting each picture element into a signal in which "1" (or "0") occurs in succession by the number corresponding to the gradation level of the picture element.

10. A driving equipment according to any one of claims 1 to 4 wherein the reproduction elements are light emission elements for recording on photosensitive paper.

* * * * *